United States Patent [19]
Kondo et al.

[11] Patent Number: 5,841,861
[45] Date of Patent: Nov. 24, 1998

[54] OPTICAL RECORDING MEDIUM AND REPRODUCING APPARATUS FOR OPTICAL RECORDING MEDIUM

[75] Inventors: Tetsuya Kondo; Hirofumi Nagano, both of Yokohama, Japan

[73] Assignee: Victor Company of Japan, Ltd., Tokyo, Japan

[21] Appl. No.: 724,775

[22] Filed: Oct. 3, 1996

[30] Foreign Application Priority Data

Oct. 6, 1995 [JP] Japan .................................. 7-286447

[51] Int. Cl.⁶ ........................................................ H04L 9/00
[52] U.S. Cl. .................................................. 380/4; 380/49
[58] Field of Search ............................................ 380/4, 49

[56] References Cited

U.S. PATENT DOCUMENTS 5,696,757 12/1997 Ozaki et al. ......................... 369/275.4
5,699,434 12/1997 Hogan ..................................... 380/49

FOREIGN PATENT DOCUMENTS 2-287970 11/1990 Japan .
7-21687 1/1995 Japan .

*Primary Examiner*—David Cain
*Attorney, Agent, or Firm*—Michael N. Meller

[57] ABSTRACT

An optical recording medium has a plurality of layers of recorded information including at least digital data of picture, music, or computer software in a form of recorded marks or pits readable by optical means. The digital data is divided into a plurality of data groups, each group being smaller than a recordable capacity of each layer, and the divided data groups are distributed among the plurality of layers so that an original digital data become discontinuous within each layer.

5 Claims, 3 Drawing Sheets

OPTICAL RECORDING MEDIUM AND REPRODUCING APPARATUS FOR OPTICAL RECORDING MEDIUM

BACKGROUND OF THE INVENTION

1. Field of the Invention

The present invention relates to an optical recording medium and a reproducing apparatus, in particular, relates to a copy-protection type optical recording medium and the reproducing apparatus for the optical recording medium.

2. Description of the Related Art

Presently, there are widely used a read-only-type optical disc such as a CD (Compact Disc) for recording music information or a CD-ROM (Read-Only-Memory) for recording information such as a computer software and a database, an additionally-writable-type disc such as a write once (WO) disc on which information can be written only once, and an erasable-type disc such as a magneto-optical (MO) disc on which information can be repeatedly written. As well known, it can be easily performed to read out data recorded on a read-only-type optical disc and to record the data obtained therefrom, for instance, on another additionally-writable-type optical disc. Presently, there is rarely considered a measure to protect the music information, the computer software and the database recorded on the read-only-type optical disc from being copied. Therefore, an illegal copying can be easily performed on original CDs and CD-ROMs.

In recording a precious software on the read-only-type optical disc, however, there has been taken a measure to protect such precious software from illegal copying by employing a hardware key or a special data disc referred to as a key disc for the protection.

In the above method, however, it requires the hardware key or the key disc to protect the software from being illegally copied in addition to the recording medium for recording the software, which poses an increase of cost of the software and gives users a potential problem that the recording medium becomes impossible to be used upon breakage or loss of the hardware key or the key disc.

Recently, an optical disc which has more than two layers of information recording in the direction of its thickness is available, and for such an optical disc, a copy protection function is also required.

SUMMARY OF THE INVENTION

Accordingly, a general object of the present invention is to provide a novel and useful optical disc having a copy protection function for software or music recorded thereon and a reproducing apparatus for the optical disc without an increase of cost.

A specific object of the present invention is to provide an optical recording medium comprising a data recording area which has more than one layer of recorded digital data as marks or bits being readable optically and containing information such as pictures, music, computer software, the digital data are divided into more than one group, each group contains an amount of data smaller than a full recordable capacity of each layer of the optical disc, and the divided digital data are recorded on different layers of the optical disc each other so that an original data stream becomes discontinuous on each layer.

Another specific object of the present invention is to provide an optical recording/reproducing apparatus having more than two information recorded layers of which digital data are optically readable and contain information such as pictures, music, computer software, the digital data having main data and a cipher key, the information being ciphered to the main data, the cipher key defining a method of ciphering and deciphering, and the main data and the cipher key being recorded on different layers of the optical recording medium each other.

DETAILED DESCRIPTION OF THE PREFERRED EMBODIMENTS

The present invention will now be described in detail with reference to the accompanying drawings.

An optical disc of the present invention relates to an optical disc having more than two recorded layers, and a description will also include a signal recording/reproducing apparatus of the present invention which uses an optical disc having two recorded layers in the direction of its thickness, and for a convenience of explanation, recording/reproducing process in the present invention deals exemplary with two digital data groups A and B. Each of the digital data groups A and B is one or a combination of information such as picture, music, and computer software, and has an amount which is smaller than a recordable capacity of one layer of the optical disc.

An optical disc of the present invention is described in the following.

Figure 2:
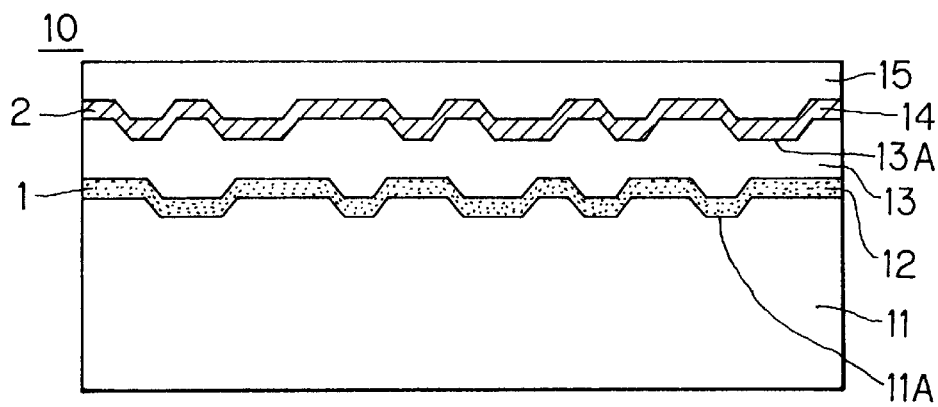
FIG. 2 shows a sectional view of a part of an optical disc of the present invention.

FIG. 2 shows a sectional view of a part of an optical disc of the present invention.

As shown in FIG. 2, the optical disc of the present invention has two recorded layers.

In FIG. 2, an optical disc 10 has a transparent substrate 11, a first reflective layer 12, a transparent layer 13, a second reflective layer 14, and a protection layer 15. A signal pit 11A forming a first information layer 1 of recorded information is formed on the transparent substrate 11. Another signal pit 13A forming a second information layer 2 of recorded information is formed. The first reflective layer 12 is made of a semi-transparent material which transmits a part of a light beam, and reflects another part of it, so as to lead the light beam to the second information layer 2. As a result, the information recorded on the first and second information layers can selectively be read by changing a focal point of a laser beam.

[First Embodiment]

FIG. 2 shows a sectional view of a part of an optical disc of the present invention.

Figure 3:
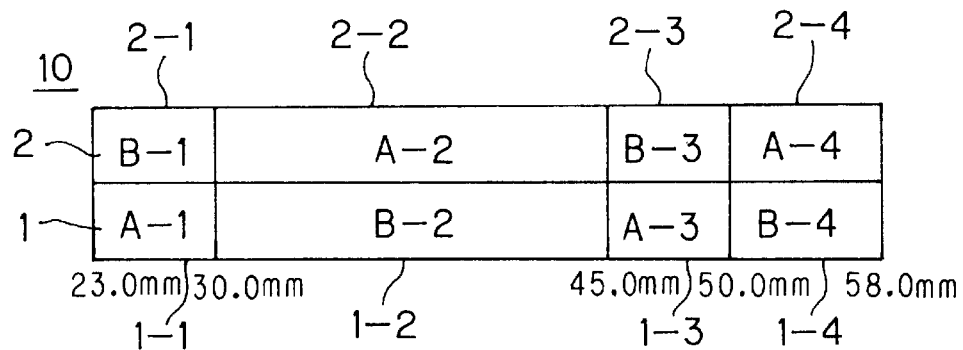
FIG. 3 shows a signal recorded structure on the optical disc of a first embodiment of the present invention shown in FIG. 2.

FIG. 3 shows a signal recording structure on the optical disc of a first embodiment of the present invention shown in FIG. 2.

First embodiment of the present invention will now be described referring to FIG. 3.

In FIG. 3, horizontal lines correspond to the radial direction of the optical disc 10. An information recorded area of the optical disc 10 of the present invention is between radiuses 23 mm and 58 mm in its radial direction. The first and second layers 1 and 2 of recorded information are shown in its vertical direction.

Each of the digital data groups A and B is divided into more than two sub-groups wherein each sub-group has a smaller amount of data than a recording capacity of one layer, and the digital data groups A and B are recorded on the two layers in a manner that any of the data groups A and B is no longer continuous. As a result, within any layer of the two digital data groups A and B are mixed each other in units of sub-groups and recorded on the first and second information layers 1 and 2 of the optical disc 10. In FIG. 3, the digital data group A is divided into groups A-1, A-2, A-3, and A-4, and recoded on an area (area 1-1) between 23 mm and 30 mm of the first information layer 1 in its radial direction, an area (area 2-2) between 30 mm and 45 mm of the second information layer 2, an area (area 1-3) between 45 mm and 50 mm of the first information layer 1, and an area (area 1-4) between 50 mm and 58 mm of the second information layer 2 respectively. Similarly, the digital data group B is divided into groups B-1, B-2, B-3, and B-4, and recorded on an area (area 2-1) between 23 mm and 30 mm of the second information layer 2, an area (area 1-2) between 30 mm and 45 mm of the first information layer 1, an area (area 2-3) between 45 mm and 50 mm of the second information layer 2, and an area (area 1-4) between 50 mm and 58 mm of the first information layer 1 respectively. Positional information (radial position, address and the like) for each sub-group is recorded on a predetermined position, such as a TOC (Table of Contents), an innermost track of the optical disc 10, or in a memory of a reproducing apparatus.

Now back to a conventional method of digital data recording on an optical disc, description will be given with reference to FIG. 1.

Figure 1:
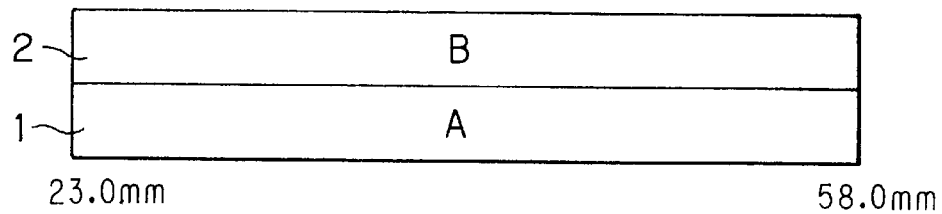
FIG. 1 shows a sectional view of a part of an optical disc of the prior art.

FIG. 1 shows a sectional view of a part of an optical disc of the prior art.

In the prior art, two digital data groups are recorded individually and continuously of each data group on an optical disc, namely, the digital data group A is recorded on the first information layer 1 continuously, and the digital data group B on the second information layer 2 continuously. In this case, the digital data groups A and B can be copied intactly by a serial data reproduction and recording on another optical medium and reproduced therefrom easily.

On the other hand, when the digital data groups are copied from the optical disc 10 of the present invention, as shown before, each of the digital data groups is no longer continuous, thus a complete reproduction of the original digital data group or groups will not be obtained. Thus, the original digital data is protected from an illegal copy.

A reproducing apparatus of the optical disc 10 of the present invention will be explained referring to FIG. 4.

Figure 4:
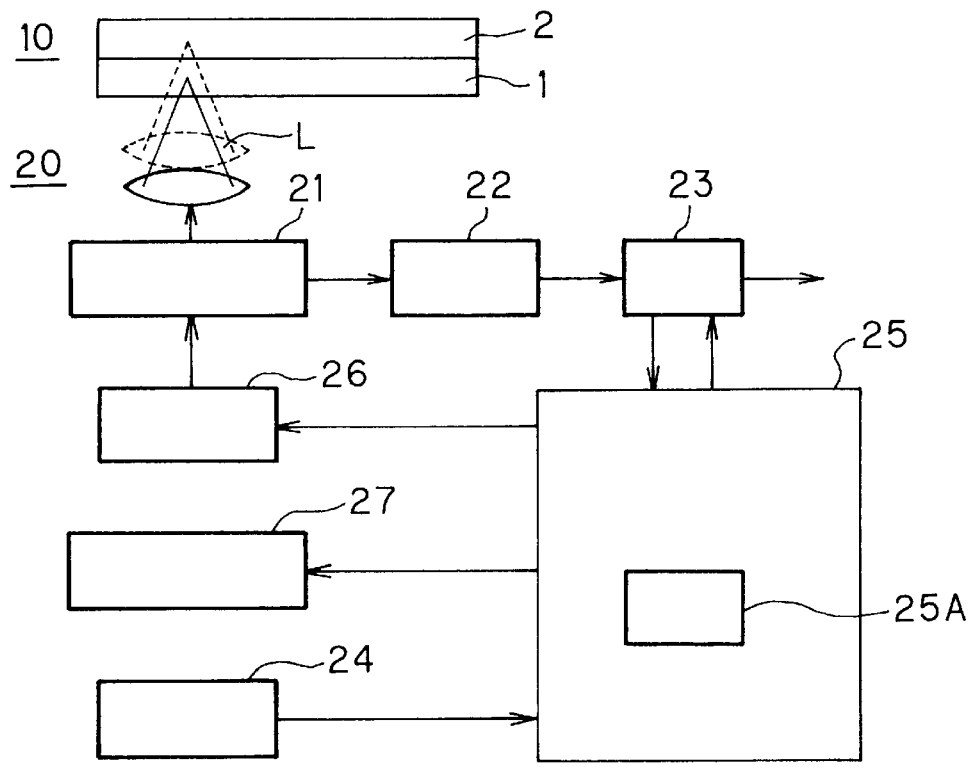
FIG. 4 shows a block diagram of a main part of a signal reproducing apparatus of the present invention using the optical disc shown in FIG. 2.

FIG. 4 shows a block diagram of a main part of a signal reproducing apparatus 20 of the present invention using the optical disc shown in FIG. 2.

In FIG. 4, the optical disc 10 has two information layers 1 and 2. Two digital data groups A and B are mixed each other and recorded on the two information layers, as shown before.

Thus recorded digital data are read out by utilizing an optical pickup 21. Optical signals of the digital data are detected and converted to electric signals by a head amplifier 22. The electric signals are sent to a signal processing circuit 23, and outputted as digital data.

Reproduction of the recorded digital data on each information layer 1 or 2 is performed by a conventional focusing technology. A light beam L is focused on an objective information layer 1 or 2 by moving the optical pickup 21 up or down. The information layers 1 and 2 are formed approximately parallel with each other, therefore, the light beam L can be focused on either information layer 1 or 2 by moving the optical pickup 21 up or down. Thus, the reproduction of the recorded digital data on each recorded layer is performed.

The optical disc 10 is set on a reproducing apparatus 20. A disc detector 24 detects a presence of the optical disc 10, and produces and sends a signal of disc detection to a microcomputer 25. The microcomputer 25 commands a disc drive apparatus 27 to drive the optical disc 10. The microcomputer 25 also commands a optical pickup drive apparatus 26 to drive the optical pickup 21, and to reproduce the TOC which is on the optical disc 10. The TOC is a time code information and an address information which show how the digital data groups A and B are divided and where they are recorded. The address information reproduced from the TOC is stored on a memory 25A provided in or out of the microcomputer 25. The microcomputer 25 outputs an optical pickup control information according to the address information to the optical pickup drive apparatus 26. The optical pickup drive apparatus 26 controls seeking operation of the optical pickup 21 and switching a focal point thereof between the first and second information layers 1, 2 according to a control signal produced by the microcomputer 25. When the data group A is intended to be reproduced, the light beam L is focused on the first information layer 1, and read out the sub-group A-1 at first. Upon the light beam 1, reaches to the end of the sub-group A-1, namely, the radial distance of 30 mm, the light beam L is focused to the second information layer 2 for the sub-group A-2, which is the area 2-2. The rests of the sub-groups are similarly reproduced. The sub-groups A-3, and A-4 are continuously reproduced by changing the focus distance of the optical pickup 21.

Advantages of the present invention will be given by describing how an illegal replication of this optical disc is prevented.

a) A replication process utilizing a conventional recording/reproducing device.

In the following, it is assumed that an illegal copy is performed on a plurality of optical discs each having only one information layer for recording.

Generally, a conventional reproducing apparatus reads out continuously, data on one information layer at a time. Using this apparatus, the illegal copy is assumed that the respective contents of the first and second information layers 1 and 2 of the optical disc 10 (FIGS. 2 and 3) are read in the order and recorded on other two single layer optical discs. As a result, the one of the two discs has the content of the first information layer 1, and another has that of the second information layer 2. When one of these discs is attempted to be reproduced by utilizing the reproducing apparatus shown in FIG. 4, the restoration of the original data group is not possible because of a lack of the data on the another disc, and the focal point switching operation according to the TOC will become erratic. When a reproduction of one of the illegally copied disc is attempted by a conventional single layer disc reproducing apparatus, a complete restoration of the original digital data group A or B is not possible because the data on the illegally copied optical disc is a mixture of the original digital data groups A and B. Thus, the contents of the disc of the present invention is protected from an illegal copy.

b) Replication by physically transferring the data to another disc.

Replicas can be made by utilizing a physical transfer-ring method without utilizing a reproducing device. The protection layer 15 (ultraviolet ray curing resin) which cover the surface of the disc 10, and the second reflective layer 14 (Aluminum) are removed by an alkaline solvent. Then the recorded layer (signal pit 13A) of the disc is exposed. Thereafter, a stamper can be produced from the disc by a conventional process such as depositing a metal film on the exposed recorded layer, and further plating a metal on the metallized recorded layer. The stamper can produce a large number of replicas. However, other than the first information layer 1 which is manufactured by injection molding a plastic material, the other layers, such as a transparent layer 13 and the protection layer 15 are usually made of ultra-violet ray curing resin, and, a first and the second reflective layers 12 and 14 are usually made of Aluminum, thus they melt away by the alkaline solvent. Therefore, the replica which may be manufactured only from the remaining first information layer, is useless as it carries a partial mixture of the original digital data groups A and B. Thus, the contents of the disc of the present invention is protected from an illegal copy.

[Second Embodiment]

Second embodiment of the present invention will now be described referring to FIGS. 4 through 7.

Figure 5:
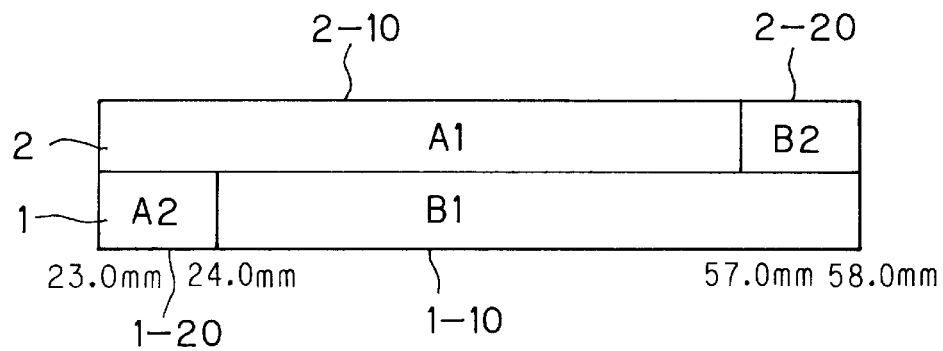
FIG. 5 shows a signal recorded structure on the optical disc of a second embodiment of the present invention.

FIG. 5 shows a signal recorded structure on the optical disc of a second embodiment of the present invention.

As shown in FIG. 5, original digital data groups A and B are ciphered in relation to respective cipher key A2 and B2, and recorded on a optical disc 10 respectively as ciphered data groups A1 and B1. This ciphering process of the original data groups A and B of the second embodiment is different from the first embodiment. The cipher key A2 for the ciphered data group A1, is recorded on a cipher key recording area 1-20 of the optical disc 10. The ciphered data group B1 is recorded on a data recording area 1-10 of the optical disc 10. Similarly, the cipher key B2 for the ciphered data group B1, is recorded on a cipher key recording area 2-20 of the optical disc 10. The ciphered data group A1 is recorded on a data recording area 2-10 of the optical disc 10. As shown above, the ciphered data group and the cipher key for the ciphered data are not recorded on a same layer, thus the content of the original disc of the present invention is protected from an illegal copy when the information layers are attempted to be copied individually. When this principle, that the cipher key and the related data group to be deciphered thereby are not recorded on a same information layer each other, is applied to an optical disc having three or more information layers, the original digital data groups can not be restored. When the cipher key and the related ciphered data group are recorded on different information layers each other, they can be recorded on any information layers, and any positions thereof. Each of the cipher key and the related ciphered data are not required to be continuous, and can be divided into various parts. For example, the cipher key B2 may be divided into cipher keys B2-1 and B2-2, and the cipher key B2-1 may be recorded on an area between 40.0 mm and 40.5 mm in a radial direction of the optical disc, and the cipher key B2-2 may be recorded on the area between 57.5 mm and 58.0 mm thereof. On the residual area thereof, the ciphered data group A1 may be recorded.

Figure 6:
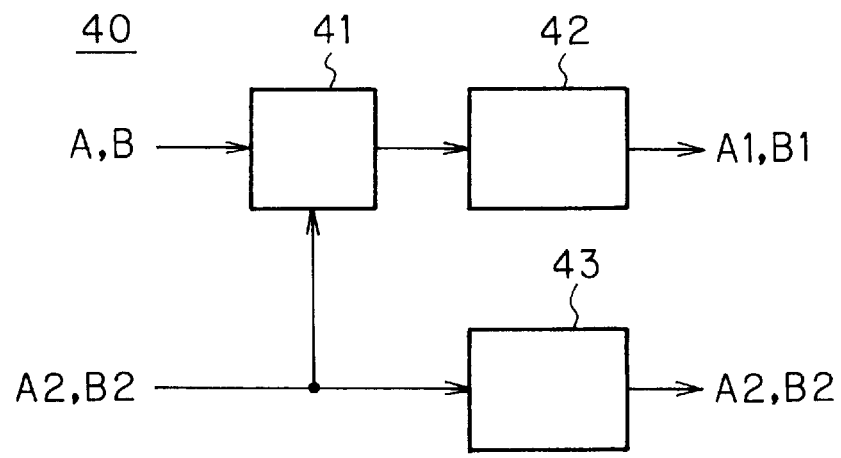
FIG. 6 shows a block diagram of a main part of a signal recording apparatus of the present invention for recording the optical disc having the signal recording structure shown in FIG. 5.

The ciphered data groups A1, B1, and the cipher keys A2, B2 are recorded on the optical disc 10 utilizing a recording apparatus 40 shown in FIG. 6.

FIG. 6 shows a block diagram of a main part of a signal recording apparatus of the present invention for recording the optical disc having the signal recording structure shown in FIG. 5.

In FIG. 6, a ciphering device 41 ciphers the original digital data groups A, B in relation to the cipher keys A2, B2 respectively. A main data recording device 42 records the ciphered data groups A1, B1 on the optical disc 10. A cipher key recording device 43 records the cipher keys A2, B2 on the optical disc 10.

An operation of the recording apparatus 40 will now be explained.

The original data groups A, B are inputted to the ciphering device 41, and the ciphering device 41 ciphers the original data groups A, B respectively by utilizing corresponding cipher keys A2, B2. The method of ciphering is, for example, to divide data into a plurality of groups having few bits of data, and to shift each bit to the right or left within a group. The ciphering apparatus 41 is preliminary built with a predetermined ciphering rules of above as a firmware. The cipher key contains ciphering and deciphering information as well as their rules.

As shown before, the ciphering apparatus 41 ciphers the original digital data groups A, B into the ciphered data groups A1, B1, utilizing the cipher keys A2, B2. The ciphered data groups A1, B1 are outputted to the main data recording device 42. The main data recording device 42 records the ciphered data groups A1, B1 on an optical disc 10 by a conventional recording technology. The ciphered data group A1 is recorded on the data recording area 2-10 of the second information layer 2. The ciphered data group B1 is recorded on the data recording area 1-10 of the first information layer 1.

The cipher keys A2, B2 are inputted to the cipher key recording device 43 and to the ciphering apparatus 41. The cipher key information recording device 43 records the cipher key A2 on the cipher key recording area 1-20, the cipher key B2 on the cipher key recording area 2-20.

As shown before, the optical disc 10 recorded with the cipher keys A2, B2 and the ciphered data groups A1, B1 ciphered by the cipher keys A2, B2, is provided. If the cipher keys A2, B2 are unknown, the optical disc 10 cannot be read, and the original data groups A, B cannot be restored from the ciphered data groups A1, B1. It is natural that the more the ciphering is intricate, the more the deciphering becomes difficult, and the more the copy protection becomes effective.

An optical disc reproducing apparatus of the present invention will be explained in the following.

Figure 7:
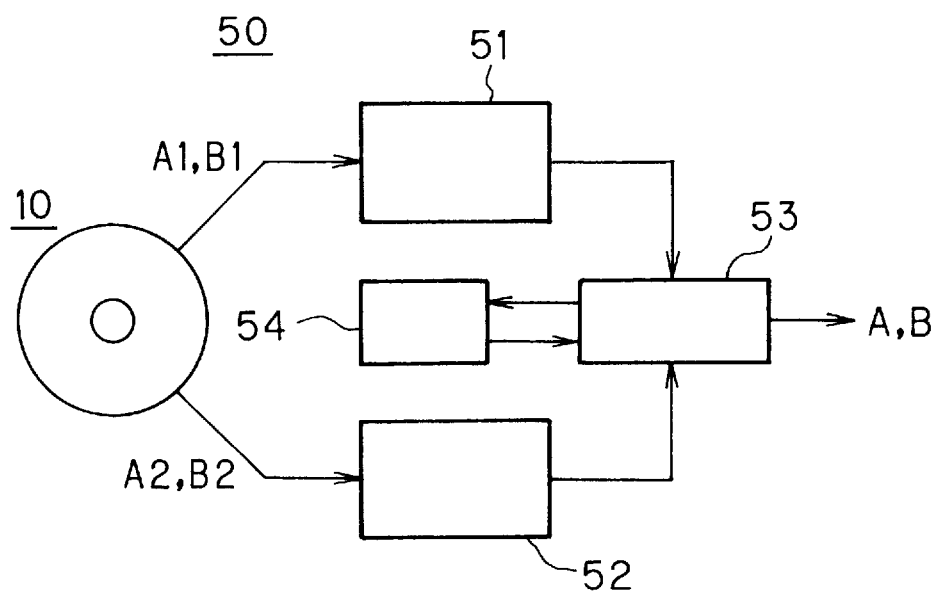
FIG. 7 shows a block diagram of a main part of a signal reproducing apparatus of the present invention for recording the optical disc having the signal recording structure shown in FIG. 5.

FIG. 7 shows a block diagram of a main part of a signal reproducing apparatus of the present invention for reproducing the optical disc having the signal recording structure shown in FIG. 5.

As shown in FIG. 7, a signal reproducing apparatus 50 has a main data reading device 51 for reading the ciphered data groups A1, B1 on the data recording areas 1–10 and 2–10 of the optical disc 10, a cipher key reading device 52 for reading the cipher keys A2, B2 on the cipher key recording areas 1–20 and 2–20, a deciphering device 53 for deciphering the ciphered data groups A1, B1 using the cipher keys A2, B2, and restoring the original digital data groups A, B, and a RAM (Random Access Memory) 54 for storing the deciphering rules. When referred to the signal reproducing apparatus 20 shown in FIG. 4, the main data recording device 51 and the cipher key reading device 52 correspond to the optical pickup 21, and the RAM 54 and the deciphering device 53 correspond to the rest of the constituting elements of the signal reproducing apparatus 20 in FIG. 4. The original digital data group A is restored from the ciphered data group A1 recorded on the second information layer 2, by using the cipher key A2 on the first information layer 1. Similarly, the original data group B is restored from the ciphered data group B1 on the first information layer 1, using the cipher key B2 on the second information layer 2.

The signal reproducing apparatus 50 will be explained following.

At first, the cipher keys A2, B2 on the optical disc to (not shown) are read by the cipher key reading device 52, and an output thereof is supplied to the deciphering device 53. In the deciphering device 53, deciphering of the ciphered data groups is performed by using the cipher keys A2, B2 according to the deciphering rules determined and stored in the RAM 54.The deciphering rules, for example, are to divide the ciphered data group A1 or B1 into x segments, and to shift each data bit within each segment by y bits to the direction of z. The deciphering rules are determined respectively for the ciphered data groups A1 and B1 as such that x is 4, y is 1, and z is right for example. Thus determined deciphering rules are stored in the RAM 54. In the above, "x" is a number of the segments, "y" is the amount of bit to be shifted, "z" means the direction right or left.

After the deciphering rules are set in the deciphering device 53, the ciphered data groups A1, B1 are read by the main data reading device 51, and an output thereof is supplied to the deciphering device 53. The deciphering device 53 deciphers the ciphered data groups A1, B1 according to the deciphering rules determined and stored in the RAM 54 for respective ciphered data groups A1, B1. Thus, the original digital data groups A, B are restored respectively, and outputted from the deciphering device 53.

In consideration of reproduction convenience, positional information, that is, information to identify recorded positions of the ciphered data groups A1, B1 and the cipher keys A2, B2 of their layers and radial distances, are recorded somewhere on the disc 10 separately from the rest, but desired to be in the area where the light beam L of the optical pickup 21 searches first. This area, for instance, may be an inner guard area so called a lead-in area of a first information layer of the MM (MultiMedia) CD-typeII (a proposed industry standard) or of a DVD (digital video disc). In this area, there is a TOC having various information such as a recording time-length in each information layers, program titles, and index numbers. Information layer numbers and the radial distances of both the cipher keys A2, B2 and the ciphered data groups A1, B1 may be recorded together with the TOC in this area.

As mentioned before, in the optical disc of the present invention, the ciphered data, and the cipher key for determining the deciphering rules for the data are recorded on different layers of the optical disc each other. Therefore, the contents of the optical disc of the present invention is protected from an illegal copy.

Variation of the recording area of the cipher keys A2, B2 will be described in the following.

The cipher keys A2, B2 are recorded following to TOC, within the lead-in area. The cipher keys A2, B2 have a signal format being same as that of the ciphered data groups A1, B1, and are recorded in a mastering process. In this case, the optical pickup 21 for reading the ciphered data groups A1, B1, is also utilized as the cipher key reading device 52. Accordingly, this arrangement provides an inexpensive optical reproducing device for copy protection because the optical pickup 21 is utilized for reproducing both the ciphered data groups A1, B1 and the cipher keys A2, B2.

The cipher keys A2, B2 may be bar codes recorded or printed at different radial positions for respective layers. The bar codes can be recorded by various methods, such as mastering as pit patterns, deposition of reflective films utilizing stencil masks, or ink printing. When bar codes are employed, the signal reproducing apparatus 50 has a bar-code reader as the cipher key reading device 52, which reads the cipher keys A2, B2, according to the information of the TOC. In this method, the ciphered data groups A1, B1 and the cipher keys A2, B2 are read by different data reading devices each other, therefore, the cipher keys A2, B2 are protected more securely. As the bar-code reader, a magnetic sensor or a capacitance sensor can be used instead of optical sensor depending on the material of the bar-code.

The cipher keys A2, B2 are recorded at a same radial distance but on different layers of the optical disc 10. However, they can be placed in different angular positions each other depending on the information layer. For example, the cipher key A2 on the first information layer is between 10 and 50 degrees, on the second information layer, between 60 and 100 degrees, and on the third information layer if any, between 110 and 150 degrees. After the bar-code reader reads the all information of the cipher keys A2, B2, a desired cipher key is selected by referring to the information of the TOC. The TOC will have an information of the recorded angles of the cipher keys if needed. In this method, the bar-code reader can be stationary, therefore, the mechanism of the optical pickup can be simple.

The above mentioned copy protection technologies of the present invention can be combined to conventional copy protection methods.

The above mentioned copy protection technologies of the present invention can be adapted to a laminated multilayer disc, a partial ROM disc, and a writable disc.

According to the present invention, an optical recording medium has more than two information layers from which digital data are optically readable. Such recording medium may contain information such as pictures, music, computer software. The digital data representing the above include ciphered data and a cipher key,the cipher key determines a method of ciphering and deciphering, and the ciphered data and the cipher key are recorded on different layers of the optical medium each other. Thus, the optical recording medium of the present invention can protect its contents from an illegal copy.

What is claimed is:

1. An optical recording medium comprising:
   a plurality of layers of recorded digital data with at least one layer having digital data arranged as original data groups in a form of marks or pits readable by optical means,
   said original digital data groups of said one layer being divided into a plurality of sub-data groups,
   each of said plurality of sub-data groups containing an amount of data smaller than a full recordable capacity of each of said plurality of layers, and
   said plurality of sub-data groups distributed among said plurality of layers so that said original digital data groups of at least said one layer becomes discontinuous within each of said plurality of layers.

2. An optical recording medium comprising:
   a plurality of layers of recorded digital data with at least one of said plurality of layers having digital data arranged as original digital data groups in a form of marks or pits readable by optical means, said original digital data groups divided into a plurality of sub-data groups, each of said plurality of sub-data groups containing main data and a cipher key, said main data being ciphered from said one of the original digital data groups, and said main data and said cipher key being recorded on different layers of said plurality of layers.

3. An optical recording medium as claimed in claim 2, wherein said cipher key is recorded on a lead-in area of said optical recording medium.

4. A reproduction apparatus for reproducing an optical recording medium, said recording medium having a plurality of layers of recorded data including at least one of original digital data groups, the recorded data being in a form of marks or pits readable by optical means, said one of the original digital data groups divided into a plurality of sub-data groups, each of said sub-groups contains an amount of data smaller than a full recordable capacity of each layer, said sub-data groups distributed among said plurality of layers so that said one of the original digital data groups becomes discontinuous within each of said layers, said sub-data groups being recorded respectively at predetermined positions of said optical recording medium, positional information representing said predetermined positions being recorded on said optical recording medium, said reproducing apparatus comprising means for selectively reading said sub-data groups according to said positional information and means for restoring said one of the original digital data groups.

5. A reproduction apparatus for reproducing an optical recording medium having a plurality of layers of recorded data including at least one of original digital data groups, the recorded data being in a form of marks or pits readable by optical means, said sub-data groups containing main data and a cipher key, said main data being ciphered from said one of the original digital data groups, said main data and said cipher key being recorded on different layers each other, said reproduction apparatus comprising means for determining deciphering rules by reading said cipher key, and means for restoring said one of the original data groups from said main data by deciphering thereof according to said deciphering rules determined by said determining means.

* * * * *